April 22, 1930. C. W. ROBERTSHAW ET AL 1,755,562
VALVE
Filed Sept. 30, 1927 2 Sheets-Sheet 1
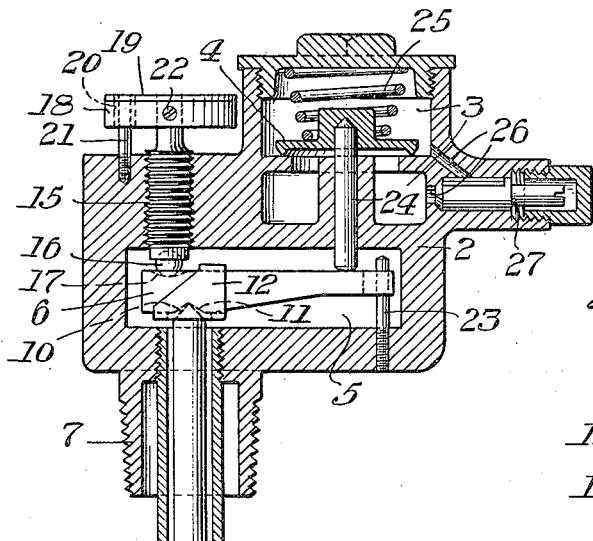
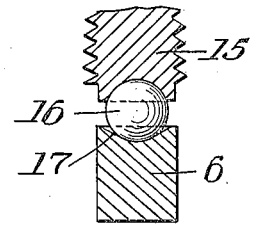
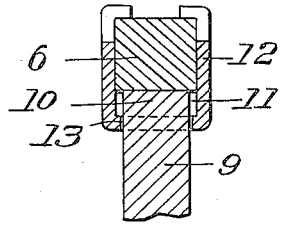
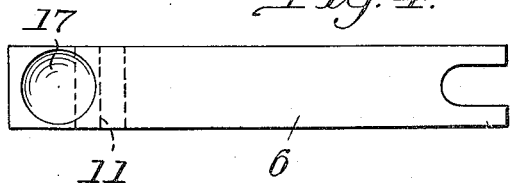
INVENTORS
Clarence W. Robertshaw
George A. Robertshaw
by their attorneys
Byrnes, Stebbins & Parmelee April 22, 1930.  C. W. ROBERTSHAW ET AL  1,755,562
VALVE
Filed Sept. 30, 1927   2 Sheets-Sheet 2
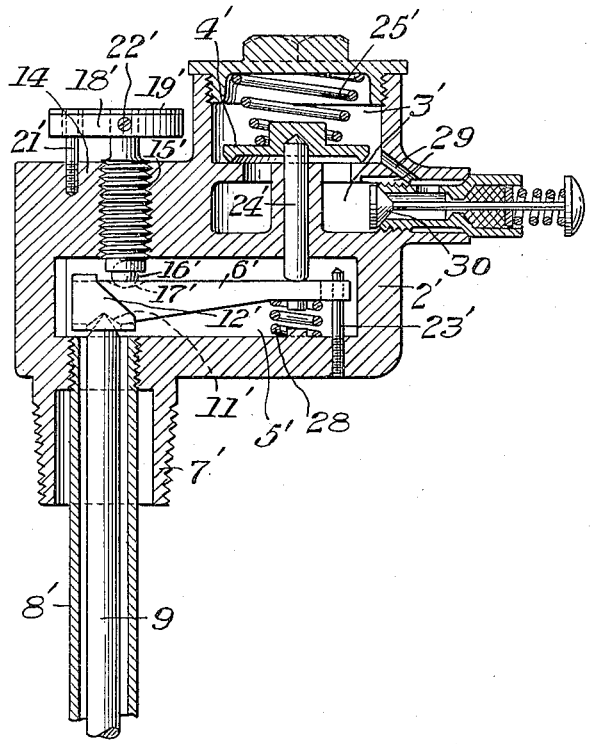
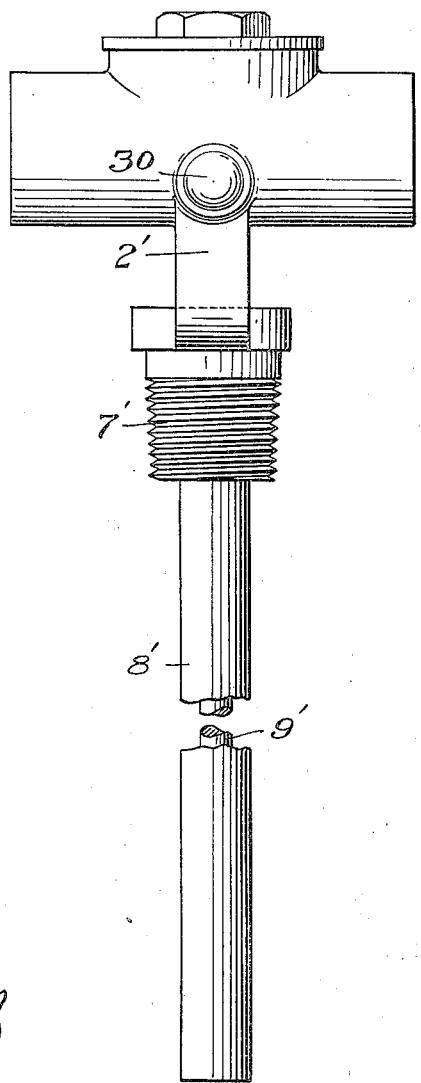
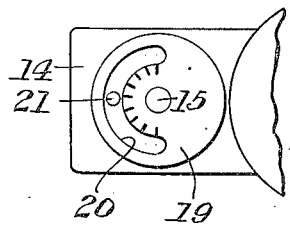
INVENTORS
Clarence W. Robertshaw
George A. Robertshaw
by their attorneys
Byrnes, Stebbins & Parmelee.

Patented Apr. 22, 1930

1,755,562

UNITED STATES PATENT OFFICE

CLARENCE W. ROBERTSHAW AND GEORGE A. ROBERTSHAW, OF YOUNGWOOD, PENNSYLVANIA, ASSIGNORS TO ROBERTSHAW THERMOSTAT COMPANY, OF YOUNGWOOD, PENNSYLVANIA, A CORPORATION OF PENNSYLVANIA

VALVE

Application filed September 30, 1927. Serial No. 223,071.

The present invention relates broadly to fluid distribution and the control thereof, and more particularly to an improved heat responsive or thermostatically controlled valve.

With the increasing use of materials having a greater inherent strength for the relatively non-expansible elements of thermostats, the demand for valve structures capable of a greater range of movement has correspondingly increased. Thermostatic valve structures answering such demands ordinarily comprise the use of a lever or lever system intermediate the heat responsive mechanism and the valve for multiplying the movement of the heat responsive parts under temperature changes. Such constructions have heretofore presented several problems both from a mechanical and an operating standpoint.

It has heretofore been customary to construct valves of the general nature herein contemplated by providing a common casing for the valve and its actuating lever, or to provide adjusting mechanism intersecting the valve casing. In either case the possibility of leakage of any of the parts in contact with the fluid, the temperature of which is to be controlled, renders the entire system liable to flooding or contamination.

The present invention relates to mechanisms of this general class, and has for its objects the provision of an improved valve structure overcoming the difficulties heretofore encountered.

In the accompanying drawings there are shown, for purposes of illustration only, certain preferred embodiments of the present invention, it being understood that the drawings do not define the limits of our invention as changes in the construction and operation disclosed therein may be made without departing either from the spirit of our invention or scope of our broader claims. In the drawings, Fig. 1 is a vertical sectional view, partly in elevation and partly broken away, through one form of valve constructed in accordance with the present invention;

Fig. 2 is a detail sectional view on an enlarged scale through the valve lever;

Fig. 3 is a similar detail sectional view through a portion of the valve lever and its adjustable fulcrum;

Fig. 4 is a top plan view of the lever itself;

Fig. 5 is a top plan view of the adjusting mechanism for the lever;

Fig. 6 is a view similar to Fig. 1 showing a slightly modified embodiment of the invention; and Fig. 7 is a side elevational view of the valve shown in Fig. 6.

In accordance with the present invention there may be provided a valve body 2 comprising a casing 3 for a valve 4, and a housing 5 for the multiplying lever or levers 6.

Projecting from the housing 5 is a threaded extension 7 adapted to be screwed into a container or support for the water or other material, the temperature of which is to be controlled. Threaded into the housing 5 is a tube 8, preferably of metal having a relatively high coefficient of expansion, and constituting the expanding element of the heat responsive mechanism. Mounted within the tube 8 in any desired manner is a relatively non-expansible element 9 preferably of metal having a relatively low coefficient of expansion in order to give increased strength. The use of other materials, such as carbon, porcelain and the like, may be resorted to depending upon the use to which the valve is to be placed.

At its upper end the relatively non-expansible element 9 is provided with a knife edge 10 cooperating with a knife edge groove 11 on one side of the lever 6. In order to prevent displacement of the lever relatively to the non-expansible element, it may be surrounded by a clip or strap 12 as clearly shown in Figs. 1 and 2. The portion of the clip which comes adjacent the groove 11 is formed with an opening 13 of such diameter as to freely receive the open end of the element 9 while preventing undue lateral movement with respect thereto. Such a construction enables an accurate groove to be machined in the lever by continuing the same across one face thereof, and at the same time enables the parts to be easily assembled.

Extending from the valve body is a projection 14 out of communication with the valve casing 3 and formed with a threaded opening in alinement with the lever 6 for the reception of an adjusting screw 15. This adjusting screw at its lower end is shaped to receive a ball 16 adapted to cooperate with a suitably shaped recess 17 in the face of the lever opposite that containing the groove 11, the groove 11 and the recess being offset longitudinally of the lever in one direction or the other, depending upon the character of movement which it is desired to impart to the lever under a predetermined temperature change. Carried by the screw 15 is a head 18 of any desired construction carrying a dial 19. The head and dial are both preferably provided with a slot 20 for cooperation with a pin 21 extending upwardly from the projection 14.

During assembly the screw 15 is threaded into position to such an extent as to locate the lever 6 in the manner desired. Thereafter the head 18 may be moved relatively to the screw 15 by means of a clamping screw 22 or the like, to bring the slot 20 into such position as to properly cooperate with the pin 21 when threaded into the projection. With the parts assembled, a complete rotation of the screw is prevented, and this, in turn, makes it impossible to lose the original setting of the parts.

At its free end the lever 6 may be bifurcated, as clearly shown in Fig. 4, for cooperation with a guide pin 23 extending upwardly into the lever housing 5. Suitably positioned in the valve body is a valve stem 24 constituting an operating connection between the lever 6 and the valve and effective for moving the valve in one direction. Movement of the valve in the opposite direction may be accomplished in any desired manner, as, for example, by means of a spring 25.

The valve may be provided with the usual by-pass port 26 controlled by an adjustable valve 27 for permitting the continuous passage of a predetermined minimum amount of fluid, as well understood by those skilled in the art.

The construction illustrated in Fig. 1 is effective upon an increase in temperature for permitting the valve to close. In certain cases, as, for example, with so called thermostatically controlled pilot valves, it is desirable to provide a construction operating upon an increase of temperature for supplying a greater volume of gas to the pilot to thereby insure its remaining lighted during such times as the burners are out of operation. In Figs. 6 and 7 there is illustrated a valve for this purpose, the parts in Figs. 6 and 7, corresponding to the parts already described, being designated by the same reference characters with a prime affixed thereto. In this embodiment, the groove 11' in the lever 6' is offset relatively to the recess 17' in the opposite manner to that indicated in Fig. 1, whereby an increase in temperature permits the lever 6' to rock about the ball 16' in a counter-clockwise direction as viewed in Fig. 6. This movement is insured by the provision of a spring 28 suitably supported in the lever housing 5' and cooperating therewith in any desired manner. Such a movement of the lever 6' acts through the valve stem 24' to unseat the valve 4' against the action of the spring 25'. As the temperature decreases, thereby representing a condition in which the main burners are brought into operation so that the pilot may be decreased, the parts move in the opposite direction and the valve 4' tends to close.

This valve may be provided with an open by-pass port 29, insuring at all times a minimum of gas to the burners and with a manually operable valve 30 adjusted to be pushed inwardly at will to facilitate lighting of the pilot.

In both embodiments of the invention, the housing 5 or 5', which communicates with the interior of the relatively expansible tube 8 or 8', is provided with freely open sides whereby free communication to the exterior is insured. By reason of this construction, if the tube 8 or 8' should corrode or in any other manner permit the passage of liquid into and through the same, such liquid would pass freely from the open sides of the housing without entering the valve casing 3 or 3'. In this manner the possibility of the passage of liquid into the fuel system is obviated.

Both constructions also provide a projection on the valve body through which adjusting mechanism extends without intersecting the valve casing. This is desirable in that it minimizes the possibility of leakage of the controlled fluid, and at the same time makes it unnecessary to provide any special packing therefor.

The relatively expansible tube preferably has a greater internal diameter than the external diameter of the relatively non-expansible element to thereby permit the slight rocking movement of the latter than may be occasioned by movements of the multiplying lever.

The freely open sides of the lever housing permit the lever to be easily inserted into or removed from position, the removable clip 12 or 12' preventing undue relative movement between the parts.

We claim:

1. In combination, a member having a knife edge thereon, a second member having a slot cooperating with said knife edge, and means at least partly embracing said second member and carried thereby for preventing relative movement between said members in the direction of the slot.

2. In combination, a member having a knife edge thereon, a second member having a slot cooperating with said knife edge, and a clip removably carried by said member and embracing said slot for preventing relative movement between the members in the direction of said slot.

3. In a valve, a valve body having a valve casing therein and a lever housing cooperating therewith, a projection on said casing at one side thereof, a valve in said casing, a lever in said housing, operating means for said lever, and an adjusting mechanism for said lever extending entirely through said projection out of communication with said casing and valve, there being a removable closure for said casing, said closure and adjustment being rotatable about substantially parallel axes.

4. In a valve, a valve casing having a plurality of projections thereon, one of said projections providing a housing freely open to the exterior, a valve controlling lever in said housing, a valve in said casing controlled by said lever, operating means for said lever, and lever adjusting means in another of said projections laterally offset relative to said valve but movable in a direction substantially parallel to the direction of movement of the valve.

5. In a valve, a valve casing having a plurality of projections thereon, one of said projections providing a housing freely open to the exterior, a valve controlling lever in said housing, a valve in said casing controlled by said lever, operating means for said lever, and lever adjusting means in another of said projections, said lever adjusting means being out of communication with said casing and being laterally offset relative to said valve and movable in a direction substantially parallel thereto.

6. In combination, a member having a knife edge thereon, a second member having a slot cooperating with said knife edge, and means at least partly embracing said second member and detachably carried thereby for preventing relative movement between said members in the direction of the slot.

7. In combination, a member having a knife edge thereon, a second member having a slot cooperating with said knife edge, and means detachably cooperating with said second member and providing removable side walls for the ends of said slot for preventing relative movement between said members in the direction of said slot.

8. In combination, a member having a knife edge thereon, a second member having a slot cooperating with said knife edge, and means detachably cooperating with said second member and providing removable side walls for the ends of said slot for preventing relative movement between said members in the direction of said slot, said means being in the form of a clip substantially embracing the member by which it is carried.

In testimony whereof we have hereunto set our hands.

CLARENCE W. ROBERTSHAW.
GEORGE A. ROBERTSHAW.